US011524460B2

(12) United States Patent
Zamorano et al.

(10) Patent No.: US 11,524,460 B2
(45) Date of Patent: Dec. 13, 2022

(54) 3D PRINTER AND 3D PRINTING

(71) Applicant: HEWLETT-PACKARD DEVELOPMENT COMPANY, L.P., Spring, TX (US)

(72) Inventors: Juan Manuel Zamorano, Sant Cugat del Valles (ES); Albert Trenchs Magana, Sant Cugat del Valles (ES); Anna Torrent, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 455 days.

(21) Appl. No.: 16/486,068

(22) PCT Filed: Apr. 5, 2017

(86) PCT No.: PCT/US2017/026106
§ 371 (c)(1),
(2) Date: Aug. 14, 2019

(87) PCT Pub. No.: WO2018/186849
PCT Pub. Date: Oct. 11, 2018

(65) Prior Publication Data
US 2020/0001537 A1     Jan. 2, 2020

(51) Int. Cl.
*B29C 64/393* (2017.01)
*B29C 64/364* (2017.01)
(Continued)

(52) U.S. Cl.
CPC .............. *B29C 64/364* (2017.08); *B22F 3/24* (2013.01); *B22F 10/20* (2021.01); *B28B 1/001* (2013.01);
(Continued)

(58) Field of Classification Search
CPC ... B29C 64/364; B29C 64/393; B29C 64/379; B29C 64/153; B22F 3/24; B22F 12/00;
(Continued)

(56) References Cited

U.S. PATENT DOCUMENTS

| 5,658,412 | A | 8/1997 | Retallick |
| 7,008,206 | B2 | 3/2006 | Fong |

(Continued)

FOREIGN PATENT DOCUMENTS

| CN | 104959606 A | 10/2015 |
| WO | WO-2015164954 A1 | 11/2015 |
| WO | WO-2016192748 A1 | 12/2016 |

OTHER PUBLICATIONS

Sachs, E. et al, "Production of Injection Molding Tooling with Conformal Cooling Channels Using the Three Dimensional Printing Process", Apr. 8, 2004, <http://onlinelibrary.wiley.com/wol1/doi/10_1002/pen_11251/abstract>.

*Primary Examiner* — Monica A Huson
*Assistant Examiner* — Kelsey C Grace
(74) *Attorney, Agent, or Firm* — HP Inc. Patent Department

(57) ABSTRACT

A 3D printing system comprising: a selective solidification module to: form a printed article by processing a build material; and form a printed container encompassing the printed article and a portion of unused build material about the printed article, the printed container defining a first port and a second port fluidly connected to the first port. The 3D printing system further comprises a connector to couple to the first port or second port of the printed container; and a pump fluidly connected to the connector to cause a fluid to flow through the printed container from the first port to the second port such that the printed article is cooled by the fluid flow.

19 Claims, 8 Drawing Sheets

(51) Int. Cl.
*B33Y 30/00* (2015.01)
*B33Y 50/02* (2015.01)
*B22F 3/24* (2006.01)
*B28B 1/00* (2006.01)
*B28B 17/00* (2006.01)
*B22F 10/20* (2021.01)
*B33Y 40/20* (2020.01)
*B29L 31/00* (2006.01)
*B22F 10/30* (2021.01)

(52) U.S. Cl.
CPC ........ *B28B 17/0081* (2013.01); *B29C 64/393* (2017.08); *B33Y 30/00* (2014.12); *B33Y 40/20* (2020.01); *B33Y 50/02* (2014.12); *B22F 10/30* (2021.01); *B22F 2003/248* (2013.01); *B29L 2031/712* (2013.01)

(58) Field of Classification Search
CPC ...... B22F 10/20; B22F 10/70; B22F 2998/10; B22F 2999/00; B22F 10/30; B22F 3/003; B22F 2003/248; B22F 2003/244; B22F 3/1258; B22F 5/00; B28B 1/001; B28B 17/0081; B33Y 50/02; B33Y 40/00; B33Y 30/00; B33Y 10/00; B29L 2031/712; Y02P 10/25
See application file for complete search history.

(56) References Cited

U.S. PATENT DOCUMENTS

| | | |
|---|---|---|
| 7,261,541 B2 | 8/2007 | Fong |
| 9,403,235 B2 | 8/2016 | Buller |
| 2016/0039005 A1 | 2/2016 | Chu |
| 2018/0050487 A1* | 2/2018 | Hodgdon ................. A61K 8/84 |
| 2019/0126347 A1* | 5/2019 | Roman ................. B29C 64/259 |

* cited by examiner

3D PRINTER AND 3D PRINTING

BACKGROUND

Additive manufacturing techniques, such as three-dimensional (3D) printing, relate to techniques for making 3D objects, or articles, of almost any shape from a digital 3D model through additive processes in which 3D articles are generated on a layer-by-layer basis under computer control. A large variety of additive manufacturing technologies have been developed, differing in build materials, deposition techniques and processes by which the 3D article is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D article to be manufactured. This digital representation is virtually sliced into layers by computer software or may be provided in pre-sliced format. Each layer represents a cross-section of the desired article, and is sent to an additive manufacturing apparatus, which in some instances is known as a 3D printer, where it is built upon a previously built layer. This process is repeated until the printed article is completed, thereby building the article layer-by-layer. While some available technologies directly print material, others use a recoating process to form additional layers that can then be selectively solidified in order to create the new cross-section of the article.

The build material from which the article is manufactured may vary depending on the manufacturing technique and may comprise powder material, paste material, slurry material or liquid material. The build material is usually provided in a source container from where it may be transferred to the building area or building compartment of the additive manufacturing apparatus where the actual manufacturing takes place. For the example of powder build materials, these are fused together during the printing process. Excess, unfused powder may be recycled for use in a future printing process.

BRIEF INTRODUCTION OF THE DRAWINGS

Examples of the disclosure are further described hereinafter with reference to the accompanying drawings, in which.

DETAILED DESCRIPTION

Figure 1:
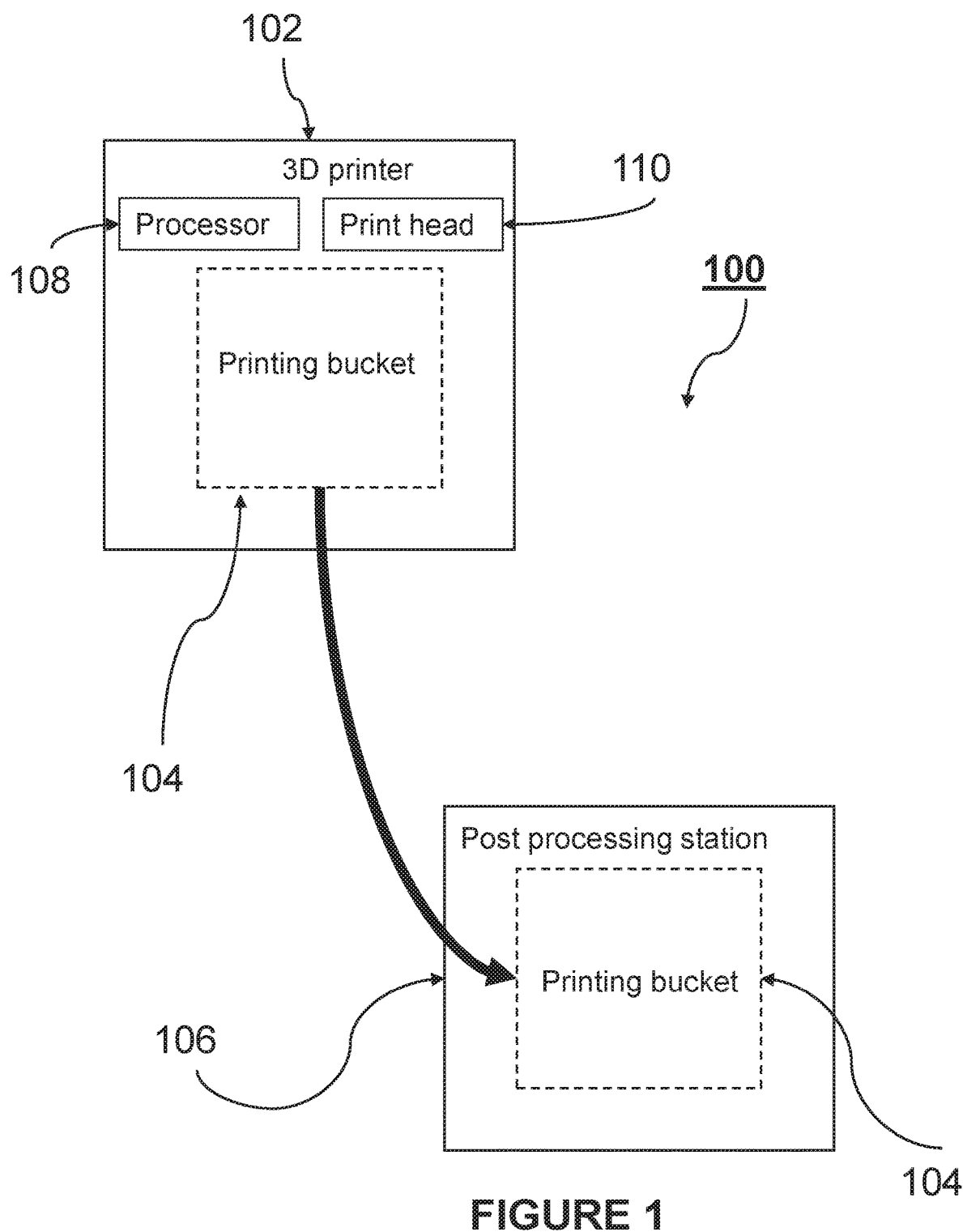
FIG. 1 shows an example of a 3D printing system.

In Additive manufacturing processes such as 3D printing the processing of build material into the printed article may result in heating of the printed article and build material. A cool-down stage may be employed before the printed article may be extracted from the remaining, unused build material, increasing overall production times. Thus, a decrease in the time allotted to cool down the printed article may increase production efficiency. However, it may be desirable for further processes to occur to the printed article subsequent to printing including heat-treatment processes, such as annealing and curing, in order to facilitate desired material properties in the printed article.

Annealing is a heat-treatment process for stress-relief of a material. Annealing facilitates the reduction of internal stresses and total elastic energy stored in inter-atomic bonds within a treated material. The term is used for appropriate heat-treatments of metals, ceramic glasses, and high-performance polymers, for example.

Curing may refer to a heat-treatment process for accelerating a chemical reaction in a material, though it is noted that the term curing may also refer to a material change in a polymer material without the application of heat (for instance, when exposed to ultra violet light. Curing through the application of heat may be applicable to polymeric and polymeric composited materials in 3D printing.

For a 3D printed article to undergo suitable annealing and curing the printed article may be maintained at a temperature within a particular temperature range for a predetermined period of time. This temperature range may depend on the material properties. It may be desirable for 3D printed articles to be subjected to annealing and curing processes subsequent to printing by avoiding the 3D printed articles from cooling too rapidly. This therefore places a constraint on the cooling rate of the printed article, in that if it is cooled too quickly, these processes may not satisfactorily occur. Therefore, a technique of simply extracting the printed article from the surrounding unused build material, which acts as a store of thermal energy and as an insulator, and cooling it as quickly as possible may not be appropriate for some printing processes.

The printed article may be cooled slowly enough to allow time for annealing and curing to occur by simply leaving the printed article in the surrounding unused build material until the bulk of build material has cooled, whether this is on the build platform or in a printing bucket extracted from the build platform of a 3D printer and moved to a post-processing station, for example. However, this method has the drawback of potentially taking a long time to cool, as the bulk of unused build material may store a large quantity of thermal energy or act as an insulating layer slowing cooling. Specifically, if the printed article is left with the bulk of the unused build material (for the example of a powdered build material, this may be referred to as a powder cake) annealing or curing may be complete long before the printed article has cooled sufficiently to be removed. Clearly when the cooling takes place within the 3D printer this causes a significant delay before a new printing operation can take place. Even where the printed article within the surrounding unused build material is first moved to a post-processing station for cooling, this can still cause a significant constraint on throughput for the 3D printing system (as well as delaying the delivery of the particular 3D printed article).

Alternative methods may improve the rate of cooling, such as by removing the 3D printed article and surrounding unused build material from the 3D printer (as noted previously), and allowing this to cool separately from the 3D printer (for instance in a post processing station or area). This method may also enable the 3D printer to be used for a new printing process while the first printed article is cooling, if the printing operation has been performed in a removable structure. This removable structure may be a bucket like container or removable printing platform. However, this method may still result in long cooling times as the printed article remains surrounded by unused build material.

Alternative methods for cooling may further reduce the cooling time, for example by vibrating the printing bucket or otherwise causing unused build material to fall away from the printed article. However, this may risk damage to the printed article if it is caused to move excessively. Additionally, if the printed article cools too rapidly then annealing or curing may be impaired.

As shown in FIG. 1, a three dimensional (3D) printing system 100 (or additive manufacturing system) according to one example comprises: a 3D printer 102 and a post processing station 106. The post processing station 106 may process the printed articles after printing has been completed. According to other examples of a 3D printing system there may be no post processing station and operations described below as being performed in a post processing station may be performed within the 3D printer 102.

The 3D printer 102 may form 3D printed articles by processing build material in a manner which will be familiar to the skilled person. The build material may be or include, for example, powdered metal materials, powdered composited materials, powder ceramic materials, powdered glass materials, powdered resin material, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance. The 3D printer 102 includes a processor 108 arranged to receive printing instructions during a 3D printing operation and a print head 110 arranged to process build material under the control of the processor. It will be understood that the term "print head" relates to a 3D printing technique whereby a fusing agent is deposited onto a layer of build material to selectively fuse the layer of build material. The print head may comprise a fluid ejection means. A print head may also be used to deposit other liquids such as a detailing agent and colours to process the layer of build material. Other forms of 3D printing, such as selective laser sintering, do not deposit a material but instead selectively apply energy to a build material. A print head is thus an example of a selective solidification module and the present disclosure is applicable to other types of selective solidification module, for instance selective laser sintering, where build material is processed. Furthermore, in other examples the print head or selective solidification module may not be under the control of a processor. For instance, the selective solidification module may directly receive and execute printing instructions.

Returning to FIG. 1, the 3D printing system 100 may further comprise a printing bucket 104, which may be placed in and removed from the 3D printer 102 and the post processing station 106. The term "printing bucket" is taken to denote a container suitable for containing build material during a 3D printing operation, and may for instance comprise an open container to which build material may be progressively added in layers for the progressive formation of layers of a 3D printed article under the action of the print head 110. The 3D printing system 100 may also further comprise a material management station (not shown) for processing of fresh build material and recycling of unfused build material from the previous printing operation for subsequent reuse. During a 3D printing process a portion of the supplied build material may be fused to form the 3D article, whilst a remaining portion of the supplied build material may remain unfused and potentially recyclable, depending upon the type of build material used.

The 3D printer 102 may have a build platform (not shown) on which the printing bucket 104 is placed and an article being manufactured is constructed. Alternatively, the printing bucket 104 may itself define a build platform. The build platform or the printing bucket may be arranged to have an actuation mechanism (not shown) such that it may be progressively moved down, such as in a stage-wise manner, towards the base of the 3D printer 102 as the printing of the 3D article progresses to accommodate the 3D article being printed. The size of an article being printed may increase progressively as it is built up layer-by-layer in the 3D printing process in this example.

The 3D printer 102 of this example can generate a 3D article by using a build material depositor carriage (not shown) to form layers of build material within the printing bucket 104. Certain regions of each deposited layer are fused by the printer 102 to progressively form the article according to article-specifying data. The article-specifying data are based on a 3D shape of the article and may also provide article property data such as strength or roughness corresponding to the whole article or part(s) of the 3D article. In examples, the desired 3D article properties may also be supplied to the 3D printer 102 via a user interface, via a software driver or via predetermined article property data stored in a memory.

After a layer of the build material has been deposited on or within the printing bucket 104 by the printer 102 a 3D printing process takes place for that layer of the build material, for instance the selective deposit a fusing agent in a pattern based on where particles of the build material are to fuse together and the application of fusing energy or selective laser sintering. The build material deposition and printing may be repeated in successive layers until a complete 3D article has been generated.

The printing bucket 104 may be configured to be lowered in stages by means of sitting on a platform (not shown) that is designed to be lowered in the 3D printer 102 relative to a print head, or may be configured such that its own base is lowered. The printing bucket 104 may be part of the 3D printing system 100 itself, or may be manufactured during the 3D printing process. For example, the base of the printing bucket 104 may be formed by 3D printing a solid layer on top of the build platform of the 3D printer 102. The walls of the printing bucket 104 may then be built up alongside the 3D printed articles in the 3D printing operation.

As will be described in greater detail below, the printing bucket 104 may have a solid base and walls to contain the build material. The printing bucket 104 may incorporate a structure to facilitate the flow of a fluid through the base or walls to cool printed articles (as again will be described in greater detail below).

Where a separate post processing station 106 is provided the printing bucket 104 may be placed in the 3D printer 102 during the printing operation and may be removed from the 3D printer 102 when the printing is complete. The 3D printer 102 may then be reused with a new printing bucket 104 or a new printing bucket 104 may be printed in a subsequent printing operation.

The printing bucket 104 may be placed in the post processing station 106 after the printing operation for controlled cooling as described in greater detail below. Alternatively, where no separate post processing station is provided the cooling described below may occur within the 3D printer 102 without removal of the printing bucket 104.

As will be discussed in more detail later, the 3D printed articles may be removed from the printing bucket 104 to facilitate controlled cooling. The 3D printed articles may be encompassed by printed containers to facilitate the cooling operation and to protect the printed articles from damage during cooling. Alternatively, the cooling operation may be performed with the printing articles and an encompassing printed container remaining in the printing bucket 104.

Figure 2:
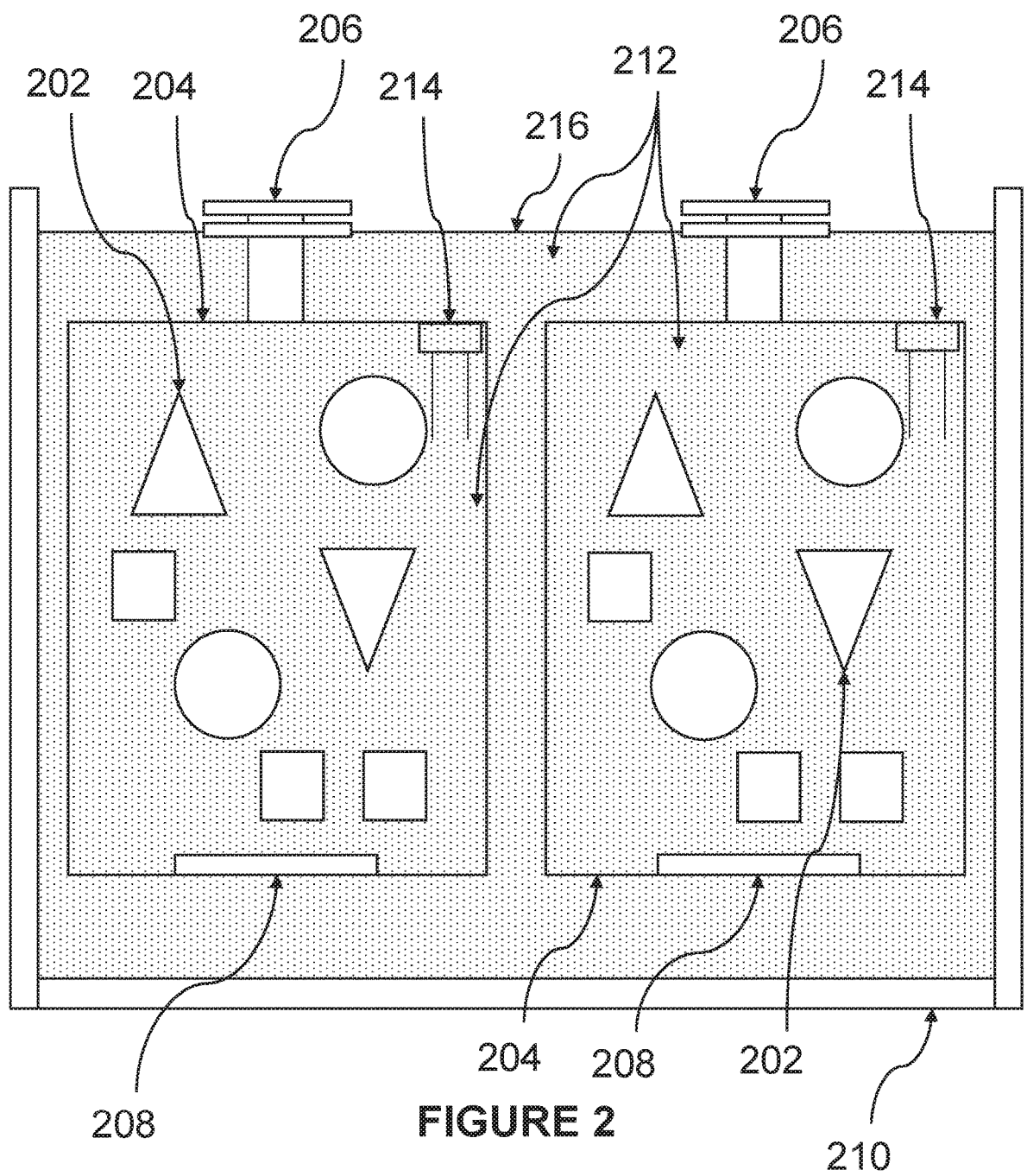
FIG. 2 shows an example of a printing bucket containing two printed containers and unused build material, each printed container encompassing a number of printed articles.

FIG. 2 illustrates a cross sectional view through a printing bucket 210 following a printing operation. As shown in FIG. 2, when a printed article 202 is completed it may be surrounded by a body of unused build material 212. The printing process can induce heating of the printed article 202 and unused build material 212. This unused build material 212 may act to store thermal energy and insulate the printed article 202, thus increasing the time taken for the printed article 202 to cool down. It may not be possible or desirable to remove the printed article 202 from the surrounding build material 212 immediately after the completion of the printing job, as subsequent heat-treatment processes may be desired.

FIG. 2 illustrates a container 204 printed at the same time as a printed article 202 and encompassing the printed article 202. In particular, FIG. 2 shows the result of a printing operation in which two containers 204 are printed, each surrounding a plurality of printed articles 202 identified by various geometric shapes within the printed containers 204. It will be appreciated that each printed container 204 may encompass one or more printed articles 202. For example, if the or each printed article 202 is formed through a layer-by-layer build process such as sintering, the printed container 204 may be simultaneously built layer-by-layer from the same build material. The printed container 204 additionally encompasses unused build material 212 surrounding the printed article 202 within the envelope of the printed container 204. The printed container 204, printed article 202, and surrounding unused build material 212 may be contained within a printing bucket 210. Specifically, the printing bucket 210 may be filled up to a top surface 216 with build material 212 following the layer by layer deposition of build material 212 and layered printing of the printed articles 202 and printed containers 204, with the result that the interior of each container 204 is also full of unused build material 212. Where the build material 212 is a powder, the total volume of build material 212 within the printing bucket 210 surrounding the printed containers 204 may be referred to as a powder cake. As discussed above, the bucket 210 may be formed integrally with the build platform of the 3D printer 102, or may be removable. The printing bucket 210 may be the printing bucket 104 of FIG. 1.

Each printed container 204 may be formed to encompass one or more printed articles 202, and may have a form that encloses the printed article 202 within it. It may be desirable to form the printed container 204 to enclose a particular number of printed articles 202 based on the material properties of the printed container 204 or the printed article 202, for example. It may also be desirable to form more than one printed container 204 within a single printing operation, with each printed container 204 encompassing different printed articles 202. For example, if a printing process produces several small printed articles and one large printed article, it may be desirable to print one printed container 204 to encompass the small printed articles, and a different printed container 204 to encompass the large printed article. Alternatively, it may be desirable to print a separate printed container 204 for each printed article 202. As a further example, printed articles 202 could be separated into separate printed containers 204 based factors relating to the manufacturing of the printed articles, for example enabling a balance to be struck between production speed and time allowed for annealing and curing (factors affecting the material properties of the printed articles 202). Increasing the number of containers 204 formed may increase the control of cooling processes (described in greater detail below) when multiple articles 202 are formed during one printing operation, but may also result in an increase in the cost for the printing operation. Specifically, as described in greater detail below, the containers 204 may be designed to opened once the encompassed printed articles 202 are sufficiently cooled. The printed containers 204 may then be disposed of. The portion of the build material used to print the containers 204 may not be recyclable.

Each printed container 204 may be formed to be rigid or flexible according to the material properties of the build material used to print the containers 204 and the printed articles 202, and also the thickness of the walls of the containers 204. If a printed container 204 is flexible, its shape may be maintained by the unused build material encompassed by the printed container 204 and encasing the printed articles 202 within the container 204 until the container 204 is opened and the printed articles 202 removed. A printed container 204 may be formed with a particular shape at a particular part of the printed container 204, such that the printed container 204 may be opened in a controlled manner to extract the printed article 202 without risking damage to it, as will be described in more detail below.

Each printed container 204 defines a first port 208 and a second port 206. For each container, the first port 208 and the second port 206 may be formed as a single body with the printed container 204. The first port 208 and second port 206 illustrated in FIG. 2 in example positions in which the first port 208 is at the base of the container 204 and the second port 206 is at the top of the container 204 when the container 204 is in its printed orientation. However, the first port 208 and second port 206 may be formed with different shapes or positions relative to each other and about the printed container 204. The first port 208 and second port 206 may be fluidly connected, such that fluid may flow from one to the other by passing through the body of the printed container 204. Specifically, a fluid such as a gas may pass from the first port 208 to the second port 206 through the body of the container 204 passing through the mass of unused build material 212 and through and around the printed articles 202 within the container 204. Accordingly, the first port 208 may be referred to as an inlet 208 and the second port 206 may be referred to as an outlet 206, and these terms are used throughout the remainder of the description of certain examples. However, it will be understood that the terms inlet and outlet are pertinent to the directed flow of a fluid through the container 204 and may be applied either way round to the first and second ports according to how fluid is provided to the container. To provide this fluid flow, in one example the outlet 206 may be formed with a particular shape such that it may couple to a connector (shown later in FIG. 3), which is in turn coupled to a pump to draw fluid through the container 204 from the inlet 208 to cool the printed articles 202 within the container 204. The inlet 208 or outlet 206 may be formed to restrict unused build material from passing through. For example, at least one of the inlet 208 and outlet 206 may comprise a printed mesh which permits the passage of the fluid but reduces the escape of build material. Accordingly, a fluid may be caused to flow through the printed container 204 while the printed container 204 remains substantially filled with build material, itself encasing the printed articles 202.

A fluid may be caused to flow through the printed container 204 from the inlet 208 to the outlet 206 to control the cooling process of the printed articles 202. For example, a printed article 202 may have an associated optimal temperature cooling curve to obtain appropriate material properties through heat-treatment processes (described in more detail below in reference to FIG. 7). The temperature curve or temperature profile describes the temperature of the printed article 202 as a function of time.

The temperature of the printed article 202 or the build material in the bucket 210 may be monitored during the cooling process, for example with the use of a temperature probe (discussed in more detail in relation to FIG. 3) inserted into the build material.

The printed container 204 may be formed with a breakable portion 214 during the printing operation. The breakable portion 214 may be formed as part of the surface of the printed container 204 during printing, but may be broken open by the insertion of a temperature probe during the cooling operation. The breakable portion 214 may be formed to receive a temperature probe such that the temperature probe is able to penetrate to a point near the printed article 202. The temperature probe may then measure the temperature of an area located within the printed container 204 and near the printed article 202. The breakable portion 214 may be configured to be breakable by the temperature probe by any means known to the skilled person, including for example, being formed to thinner than the surrounding wall of the container to allow the temperature probe to be pushed through, being formed to be friable or frangible, or being formed with a perforated boundary with the printed container 204. In another example, the temperature probe or the printed container 204 may be formed in a way to enable the temperature probe to penetrate the printed container 204 at any point so that the temperature of a target area within the printed container 204 may be measured.

Alternatively, the temperature of the printed article 202, printed container 204 or build material 212 may be monitored with the use of external temperature sensors, such as an infrared based thermometer, also referred to as a pyrometer. For example, this may be directed by a user, or the 3D printing system, to monitor and record the temperature of a particular area of the printing bucket, for example the location of the printed article 202. Alternatively, the temperature over the whole volume of the printing bucket 210 may be monitored. As a further example, the 3D printing system may comprise an integrated temperature monitoring system to monitor the temperature of the printing bucket 210, build material and printed article 202 without requiring an auxiliary device. Such a temperature monitoring system can determine the temperature of the printed article by taking account of the isolation properties of the build material. It will be understood that such an approach may be less accurate than the use of a probe positioned closer to the printed articles, as described above.

The temperature of the printed article 202 may also be calculated by monitoring the temperature of the fluid as it enters and exits the printed container 204. The temperature of the printed article 202 may be calculated or inferred based on the temperature change of the fluid as it passes through the printed container 204, information relating to the properties of the fluid and the initial temperature, and by calculating the energy transferred out of the printed container 204 by the fluid.

Temperature measurement may be performed using any of the above methods or others known to the skilled person, or the temperature may be calculated based on knowledge of the build materials and the energy supplied to the 3D printing system. That is, the expected temperature of components in the printing bucket 210 may be calculated, if the environmental and material properties of the 3D printing operation are well known. In this case, the fluid flow rate may be controlled to match a predetermined cooling rate calculated based on predetermined expected temperature curves.

The cooling fluid may be selected based on the properties of the fluid or the properties of the printed article 202, for example. Different fluids may also be chosen depending on the build material. A fluid may include air or a particular gas, for example, chosen based on the thermal properties of the fluid. Some fluids may not be appropriate based on the properties of the fluid or build material, for example, oxygen may not be a desirable fluid to use for cooling a printed article 202 at high temperatures due to possible reactions with the heated material, but an inert gas may be a more appropriate choice. Nitrogen is an example of a gas that may be suitable to act as a cooling fluid. As a further example, the fluid may be cooled to a specific temperature before being passed through the printed container 204. The temperature of the fluid may be controlled throughout the cooling operation to adjust the cooling rate to match desired temperature profiles.

The fluid may be caused to flow through the printed container 204 by a number of means. For example, a vacuum pump could be used to pull the fluid through the printed container 204 by creating a pressure gradient. Alternatively, the fluid could be injected into the printed container 204.

Mechanisms may be employed to aid the fluid in penetrating the build material contained within the printed container 204. For example, the printed container 204 or the printing bucket 210 may be vibrated, such that the particles of build material within the printed container 204 are separated from one another and from the printed article 202.

Figure 3:
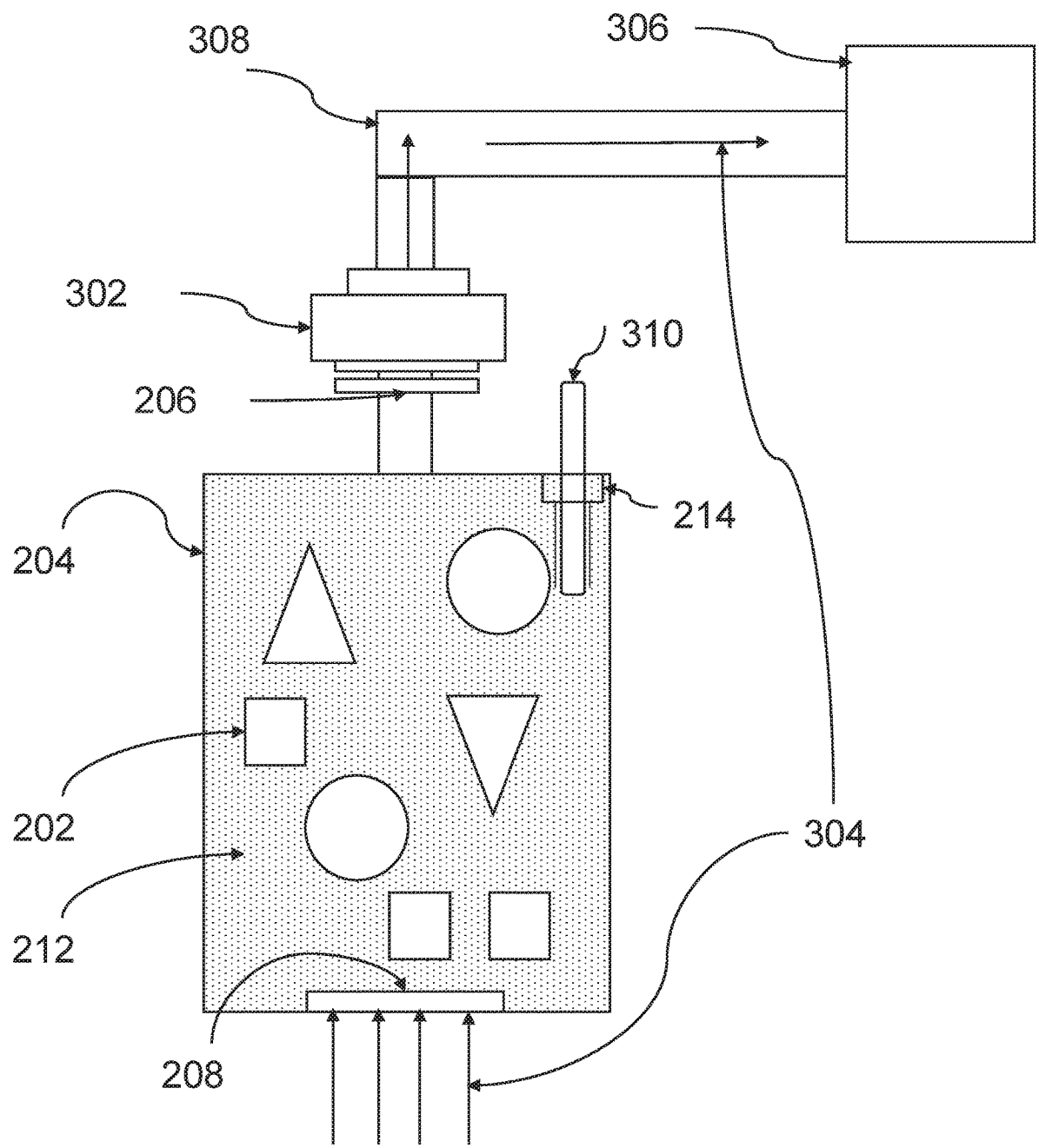
FIG. 3 shows an example of cooling fluid flow through a printed container.

FIG. 3 illustrates an example of the printed container 204 connected to part of a 3D printing system to cause fluid to flow through the printed container 204. In the example of FIG. 3, the outlet 206 is connected to a connector 302. The connector 302 may be designed to couple mechanically to the outlet 206 of the printed container 204. The connector 302 may be fluidly coupled to a pump 306 via pipe 308. The pump 306 causes fluid to flow through the printed container 204 from the inlet 208 to the outlet 206. As the fluid passes through the printed container 204, the temperature of the printed article 202 may be reduced in a controlled and deliberate manner. Referring back to FIG. 1, the cooling process may be performed by the pump 306 at either the 3D printer 102 or the post processing station 106. That is, the pump 306 may be an integral part of the 3D printer 102, an auxiliary part of it, or may be provided in a post processing station 106 (physically separate from the 3D printer but part of an overall 3D printing system 100. By providing the pump 306 in a post processing station 106, the 3D printer 102 may then be reused for a second printing operation while the cooling process is taking place.

The fluid and build material may be selected so that the fluid may pass through the printed container 204 without removal of the unused build material 212 contained within the printed container 204.

The unused build material may be prevented from leaving the printed container 204 by the inlet 208 or outlet 206. For example, the inlet 208 or the outlet 206 may be formed with a structure to prevent the build material from passing through, such as a mesh. As a further example, the connector 302 may be formed in a similar fashion to prevent the egress of the unused build material 212.

In the example of FIG. 3, the printed container 204 has been removed from the surrounding unused build material contained in the printing bucket 210 of FIG. 2. This may enable the build platform or printing bucket 210 to be reused to begin a second printing operation while the printed articles of the first printing operation are cooled in the post processing station 106. Alternatively, the printed container 204 may be connected to the connector 302 and the fluid caused to flow through the printed container 204 without removing the printed container 204 from the surrounding unused build material 212, as shown later in FIG. 4.

The printed container 204 may be removed from the printing bucket 210 and surrounding unused build material 212 by any means known to the skilled person. This may be referred to as "uncaking" or "decaking" the printed container 204 from the powder cake, where the powder cake is the unused build material 212 encompassing the printed container 204.

The printed container 204 may be coupled to the connector 302 in the post-processing station 106, or the connector 304 and pump 306 may form a part of the 3D printer 102. There may be a support platform on which the base of the printed container 204 may rest or the printed container 204 and connector 302 may be coupled such that the printed container 204 is suspended from the connector 302 during the cooling process.

In the example of FIG. 3, the connector 302 is coupled to the outlet 206. This coupling may occur through various mechanisms, including the outlet 206 and connector 302 being designed with complimentary mechanical structures, such as threaded barrels and screws, or clips. The connector 302 and outlet 206 may comprise locking mechanisms to secure the connection of the two parts. The coupling may be sealed such that a pressure gradient may be created in the printed container 204. As an alternative to FIG. 3, the connector 302 may couple to the inlet 208 instead of the outlet 206. In another example, both the inlet 208 and the outlet 206 may couple to connectors 302.

The arrows 304 illustrate an example of the path a fluid may be caused to flow through the printed container 204. The size of the arrows does not indicate flow rate, and the direction of the arrows is provided as an example. The flow of the fluid may be configured to flow in any direction through the printed container 204.

In the example of FIG. 3, the temperature probe 310 is inserted into the build material and printed article 204 through the breakable portion 214. The temperature probe may be provided in other example configurations, including full submersion, extending the whole depth of the printing bucket and protruding from the surface, or protruding into the printed container 204. In the example of the temperature probe 310 protruding a part inside the printed container 204, the temperature probe 310 may be able to monitor the temperature of the build material immediately surrounding the printed article 202.

Figure 4:
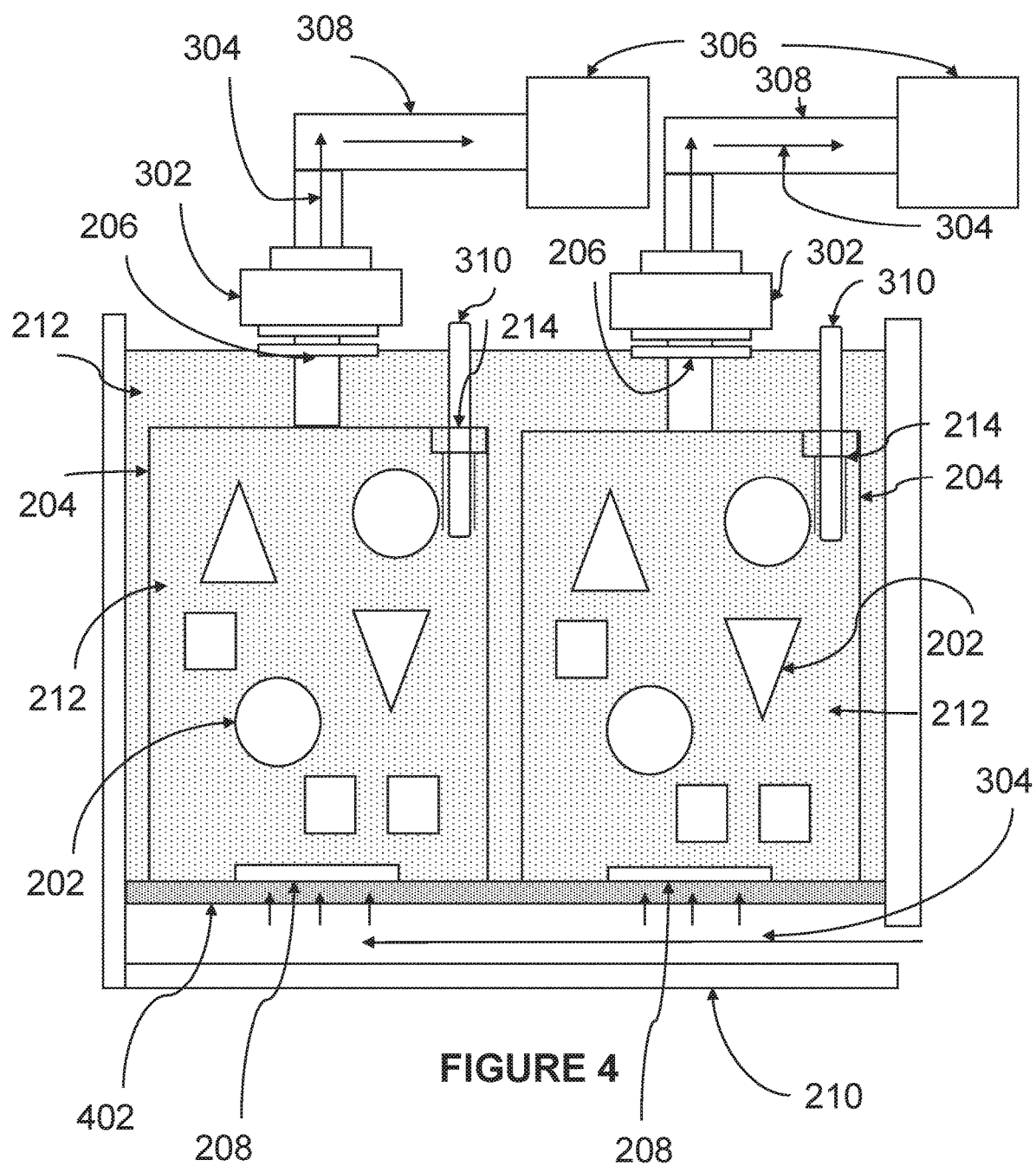
FIG. 4 shows an example of a configuration to allow fluid flow through printed containers that are still encased in unused build material.

FIG. 4 illustrates an example of a modification to the printing bucket 210 to facilitate the cooling process occurring while the printed container 204 remains in the bucket and surrounding build material. In this example, a shelf 402 may be included to form a base upon which the build material may be deposited. The shelf 402 may be designed to be porous to the fluid but not to the build material, such that the fluid may flow through the shelf 402 while the build material is prevented from passing through. The printed container 204 and shelf 402 may be arranged such that the inlet 208 and the shelf 402 are in contact, for example. Alternatively, the inlet 208 may be fluidly connected to the fluid source by means of a printed structure, passageway, or through selection of fluid and porous build material.

In the example of FIG. 4, the structure of the bucket 210 is different to the example of FIG. 3. The printing bucket 210 of FIG. 4 is an example of a structure to allow fluid to enter the space between the shelf 402 and the base of the bucket 210 when in its printing orientation. This modification may be optional, depending on the chosen fluid and build material. An example of an alternative modification that may facilitate the cooling of the printed article 202 without removing the printed container 204 from the powder cake may be to construct the bucket 210 from a similar material to the shelf 402, such that it is porous to the fluid but not to the build material. In this example, the inclusion of an additional shelf 402 may be avoided, as the fluid may be able to permeate through the walls of the bucket 210 itself.

In the example of FIG. 4, each container 204 is connected by separate connectors 302 to separate pumps 306 via separate pipes 308. As an alternative example, a single pump may be provided with multiple output valves, such that it may connect to a plurality of containers 204 at the same time and optionally may provide different flow rates of the fluid to each container 204.

The outlet 206 may be formed to be identifiable by a robotic arm or other automated system. The robotic arm may be able to identify and automatically connect to the outlet 206. In this example, the cooling of the printed article 202 may be automated by the robotic arm identifying the outlet 206, coupling to the outlet 206, and initiating fluid flow through the printed container 204.

As the skilled person would appreciate, there may be many methods to enable the robotic arm to identify and couple the connector 302 to the outlet 206. For example, the outlet 206 may be formed to be recognizable by image recognition technology by having a predetermined form. The outlet 206 may be formed with particular markers to aid this, including recognizable patterns or characters. Alternatively or in addition, a coordinate system may be defined and the coordinates of the outlet 206 may be predetermined or recording during the printing operation. These coordinates may be supplied to the robotic arm, enabling it to know the location of the outlet 206 such that the robotic arm may move to the correct location before attempting connection.

The use of the robotic arm or similar is not limited to the example of the cooling process occurring in the printing bucket 210 or a post-processing station 106. This may also be used in the examples where the printed articles 202 within a printed container 204 are cooled after the printed container 204 removed from the printing bucket 210, or where the printed container 204 is still situated in the 3D printer 102. That is, the 3D printer 102 may itself comprise means of performing automatic connection and cooling operations.

The robotic arm may perform additional functions to facilitate automation, or additional robotic arms may be combined to form a robotic system. For example, the robotic system may be employed to transfer the printing bucket 104 from the 3D printer 102 to the post processing station 106. The robotic system may also facilitate the removal of the printed container 204 from the powder cake. As a further example, the robotic system may facilitate the opening of the printed container 204 to remove the printed article 202 from the powder cake inside the printer container 204 when the cooling operation is complete.

Figure 5:
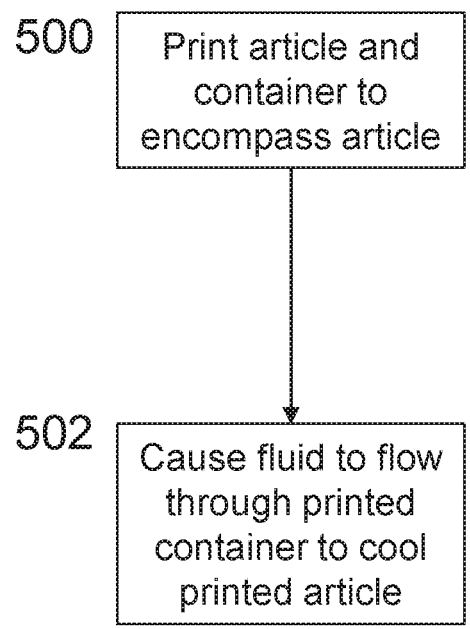
FIG. 5 shows an example 3D printing method.

An example of a method to print a 3D printed article is illustrated in the flow chart of FIG. 5. In FIG. 5, at 500 an article is printed and a container is simultaneously printed to encompass the article. These two objects may be printed during a single process, for example during the layer-by-layer build process as described above. Alternatively, different 3D printing methods may be used. For example, a particular build material may be deposited in layers according to the design of the article and container, while a different, inert build material is deposited in surrounding areas. The particular build material for the article and container could then be solidified by heating through the application of magnetic fields.

The container 204 may be printed to encompass one or more printed articles 202. The size and shape of the printed container 204, the number of printed articles 202 it encompasses, and the number of printed containers 204 formed in one printing process are examples of controllable variables relating to the printed container 204. These variables may be controlled to be a predetermined value, designated by the user, or optimised with software, for example.

The size and shape of the printed container 204 may be varied to encompass a larger or smaller volume around the printed article 202. This may have an effect on the cooling rate of the printed article 202 contained within the printed container 204. For example, if the printed container 204 is printed to encompass a large volume around a printed article 202, then a large amount of unused build material may also be encompassed by the printed container 204, forming a powder cake encompassing the printed article 202 within the printed container 204. This unused build material may act as a thermal store and an insulator and reduce the cooling rate of the printed article 202. The unused build material may also act as a buffer to protect the printed article 202 during movement of the printed container 204. The printed article 202 may be removed from the powder cake within the printed container 204 after the completion of the cooling operation.

The number of printed articles 202 contained within one printed container 204 may also be varied. For example, printing a single container to encompass a group of printed articles 202 may use fewer manufacturing resources than printing individual containers, yet may provide less control over the cooling rate of each individual printed article 202. It may therefore be desirable to print one container or several depending on the desired control and cost to the user.

At 502 in FIG. 5, fluid is caused to flow through the printed container 204. The movement of the fluid through the printed container 204 increases the cooling rate of the printed article 202 encompassed by the printed container 204, by transferring thermal energy out of the printed container 204. The fluid may be caused to flow through the printed container 204 by any of the means discussed previously, or a suitable alternative.

Figure 6:
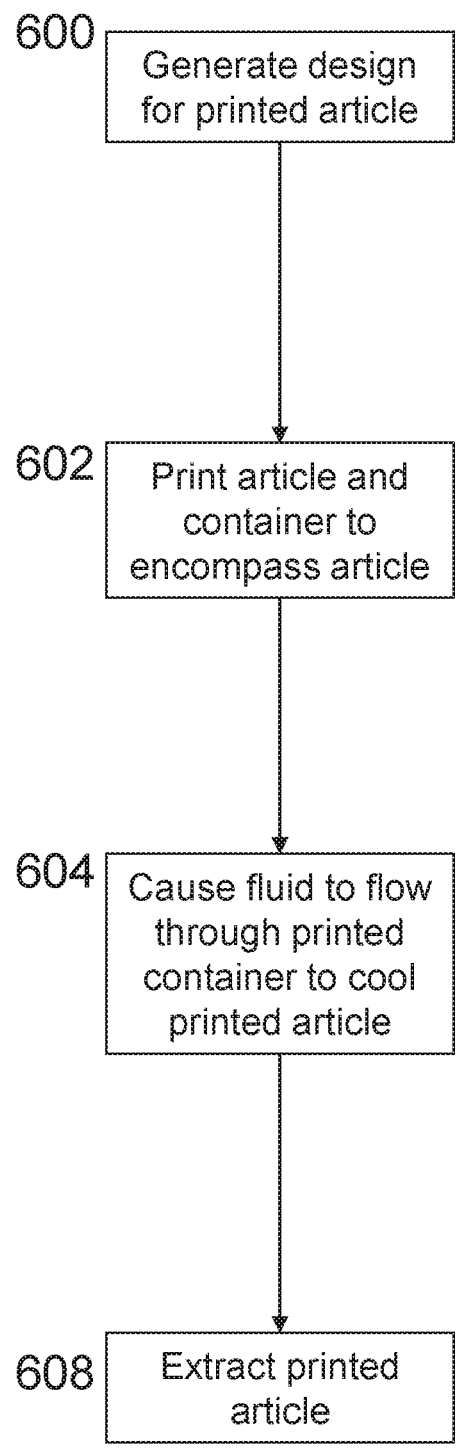
FIG. 6 shows a further example 3D printing method.

The flow chart of FIG. 6 illustrates another example printing process. At 600, a design is generated for the printed article 202. This design may be generated using specialised software, such as Computer Aided Design (CAD) software, in which a designer may model the article they wish to create. Alternatively, a design may be previously generated by another party and sent to the printing system for printing. The design may result in print data specifying the articles to be printed and the container to be printed. The design of the container may take account of the number and arrangement of articles to be contained within each container, and hence the number of containers to be printed.

The resulting design may be used to generate print data. The print data may be supplied to a print head or other form of selective solidification device which acts to print or form the or each article and the or each container. It will be appreciated that the generation of the design and/or print data for the articles to be printed and the container may be performed together or separately. For instance, the print data for the articles and the container may be formed together at a computing system separate from a 3D printer and then supplied to the 3D printer to perform the printing operations. In another example the print data or design for an article to be printed may be generated separately and then supplied to a 3D printer which may itself generate suitable print data for a container to encompass the or each design. In the latter scenario the 3D printer may include a processor to generate or adapt the print data.

The design may be processed by the 3D printer 102 into a set of instructions for printing the printed article. The 3D printer 102 may generate a series of patterns that represent the layers to be processed during the layer-wise printing process to form the article 202. It may contain information about the size, shape and material for the printed article 202. It may also contain information about how the article 202 should be formed.

The 3D printing system 100 may process several designs to form several printed articles 202 in a single printing operation, by combining these into a single set of instructions for the layer-wise printing process. The printed articles 202 may be spatially arranged in the printing bucket 210 in a particular fashion, for instance so that they do not touch one another.

At 602, an article is printed according to the instructions generated by the 3D printer 102 based on the article design. The article may be printed using similar methods to those in FIG. 5, including a layer-by-layer build process, for example. The container 204 may also be printed to encompass the article 202 according to the same set of instructions. At 604, the fluid is caused to flow through the printed container 204 in a similar way as described previously.

The printed article 202 and printed container 204 may be formed according to a single set of instructions generated for the 3D printer 102 by processing a single design encompassing the article to be printed and the container. For example, an article and a container may be designed in a single design by a user, such that the desired properties of the article and container may be achieved without requiring additional input from the operator of the 3D printing system 100 to designate the positions and structures of the printed article 202 and printed container 204. If a single design contains enough information regarding the printed article 202 and printed container 204, then the process may be automated by the 3D printing system 100.

At 606, the printed article 202 is extracted from the printed container 204. If the printed container 204 had not already been removed from surrounding build material, then first the printed container 204 may be separates from the printing bucket. Extraction of the printed container 204 may be done manually or may be automated, for instance by a robotic arm, or with the use of an agent such as a pressurised liquid or gas to clear the unused build material away from the printed container 204.

The printed container 204 may contain both the printed article 202 and unused build material. If the printed container 204 is formed to encompass the printed article 202 close to the surface of the printed article 202 it may contain a small amount of unused build material. The printed container 204 may be formed such that it can be opened in a controlled manner. For example, the printed container 204 may be formed with a particular shape at a particular position. For example, a region of the printed container 204 may be formed to be perforated so that it can easily be separated from the rest of the printed container, and the printed article 202 within can be extracted. Alternatively, the printed container 204 may be printed with a section based on a screw top lid, such that it may be twisted to open without risking damage to the printed article 202. Alternatively, the printed container may be broken open and the printed article 202 extracted. As a further example, a printed container 204 may be formed such that it encompasses a friable or frangible portion encircling the container 204 which may be readily broken when it is desired to open the container 204.

Figure 7:
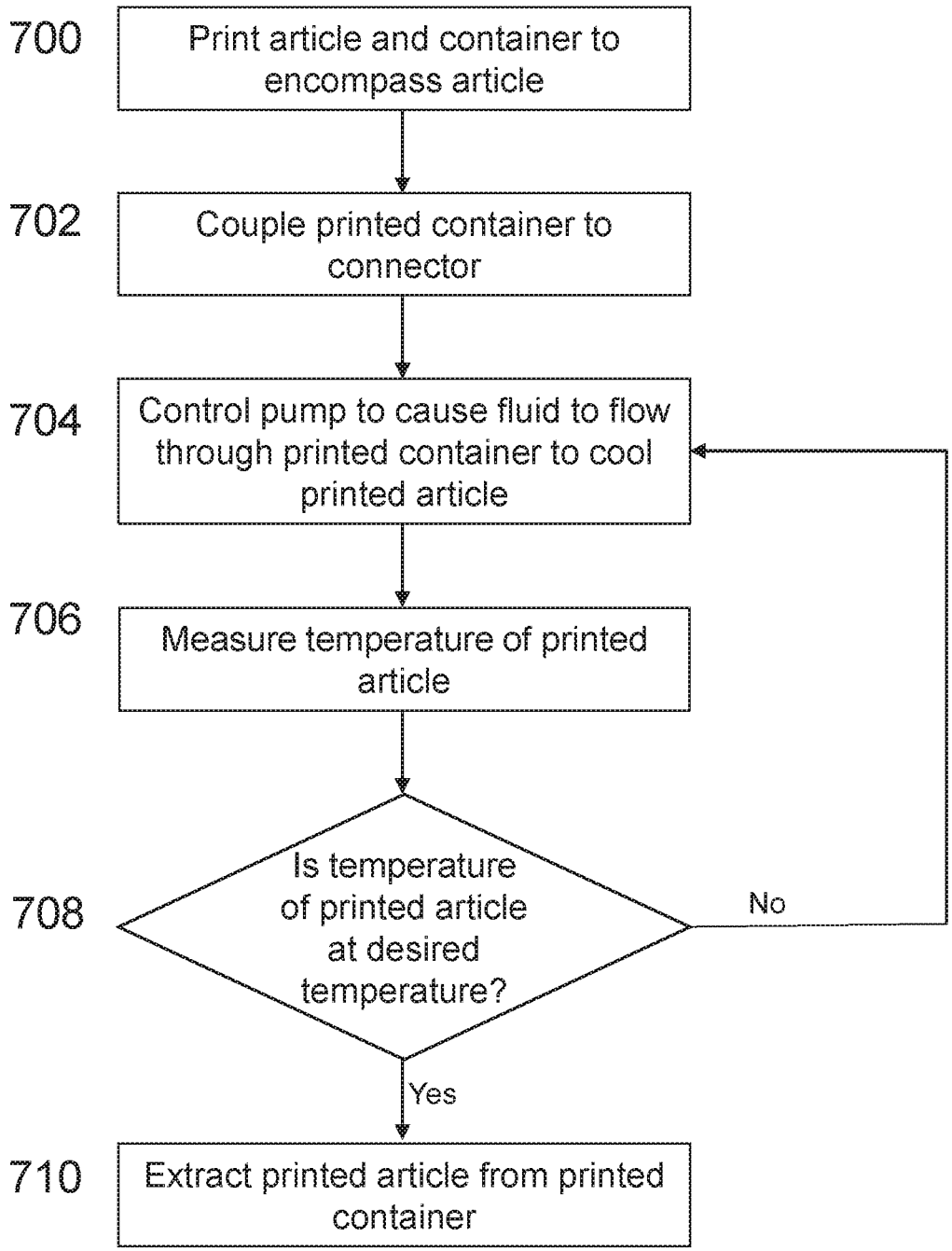
FIG. 7 shows an example of a method to print and cool 3D printed articles without extracting printed articles from a printed container.

The flow chart of FIG. 7 illustrates an alternative example process of printing and cooling a 3D printed article 202. The method of FIG. 7 may additionally comprise generating a design as described above in connection with FIG. 6. FIG. 7 additionally illustrates the method of coupling the printed container 204 to the connector 302 at 702. The printed container 204 may couple to the connector 302 by means of complimentary forms of the printed container 204 and the connector 302. For example, the printed container 204 may be formed to comprise a handle shaped to couple to the connector 302. Alternatively, the inlet 208 or the outlet 206 may be designed to couple to the connector 302.

The printed container 204 may couple to the connector 302 by means of a mechanical connection, such as a threaded screw, clips, latch or other interlocking mechanism. Alternatively, the connector 302 and the printed container 204 may be held together by a pressure gradient, the fluid flow or a suction mechanism. As a further example, the connector 302 may be formed to be larger than the outlet 206, such that the connector 302 can cover the opening of the outlet 206 without requiring perfect alignment of the two parts. The printed container 204 and connector 302 may also be provided with magnetic elements to enable magnetic coupling. The connector 302 may also couple to the inlet 208.

At 704, a pump 306 is controlled to cause fluid to flow through the printed container 204. The pump 306 may be a vacuum pump, or may correspond to a device to inject the fluid at a particular pressure into the printed container 204. For example, if the pump is a vacuum pump, then the vacuum pump may be controlled to cause a pressure difference in the printed container 204 that effectively pulls the fluid through the printed container 204 from the inlet 208 to the outlet 206. The vacuum pump may not need to be a pump that can achieve a low vacuum in sealed conditions, but may be any pump that can generate a pressure difference sufficient for the fluid to flow. Alternatively, the pump may cause fluid to flow by injecting pressurized fluid into the printed container 204.

The pump 306 may be controlled according to a desired cooling curve for the printed article 202 that may be based on the material properties of the printed article 202, or the desired properties. The cooling curve or profile may be intended to ensure that sufficient time is allowed for heat-treatment processes to be completed while allowing the printed articles 202 to sufficiently cool to permit their removal from the printed containers 204 and the unused build material 212 within a shorter period of time than if fluid had not been passed through the container 204. An appropriate cooling curve may be calculated based on knowledge of the properties of the build material and the specified material properties of the printed articles 202. The cooling curve may be achieved by controlling a fluid to flow through the printed container 204 to cool the printed article 202 contained within. For example, the length of time that the printed article 202 maintains a temperature suitable for annealing to occur may affect the properties of the finished printed article 202. It may therefore be desirable to vary the length of time spent by the printed article 202 at a temperature suitable for annealing. For example, based on the desired properties of the printed article 202, the time spent at a temperature suitable for annealing may be reduced by increasing the flow rate of the fluid by controlling the pump to facilitate a higher pressure gradient. Factors relating to the manufacturing operation, such as time restraints, may also influence the cooling curve.

Returning to FIG. 7, the temperature of the printed article 202 is measured with the temperature probe 310 or other temperature sensor as discussed previously. At 708, it is determined whether or not the temperature of the printed article 202 is at the desired temperature. If the printed article 202 is not at the desired temperature, the method may return to 704 where the pump 306 is controlled to cause the printed article 202 to be cooled. The temperature of the printed article 202 may then be measured again at a later time and the determination of whether the printed article 202 is at the desired temperature may be repeated. This process may be performed concurrently for multiple printed articles 202, with either a single temperature probe that may measure the temperature at a plurality of points across the powder cake, or with multiple temperature probes.

The temperature information obtained through the temperature probe 310 may be fed back to adapt the fluid flow rate based on the monitored cooling rate. Fluctuations in temperature across the body of unused build material may be detected and the flow rate in separate printed containers 204 may be adjusted accordingly. For example, if the temperature of a printed article 202 is detected to not meet the desired predetermined cooling rates, then the flow rate of the fluid may be adjusted to compensate for the difference.

If the printed article 202 is at the target temperature for cooling, then the method may proceed to 710 where the printed article 202 may be removed from the printed container 204 and powder cake.

In the example of FIG. 7, the printed container 204 may be surrounded by unused build material 212 in a powder cake. The printed container 204 may be coupled to the connector 302 and cooled by the flow of fluid without removing the printed container 204 from the powder cake. For example, a porous shelf 402 may be provided underneath the printed container 204 to allow fluid to flow into the printed container 204, and the outlet 206 may protrude from the surface of the unused build material. An example of this is illustrated in FIG. 4.

Figure 8:
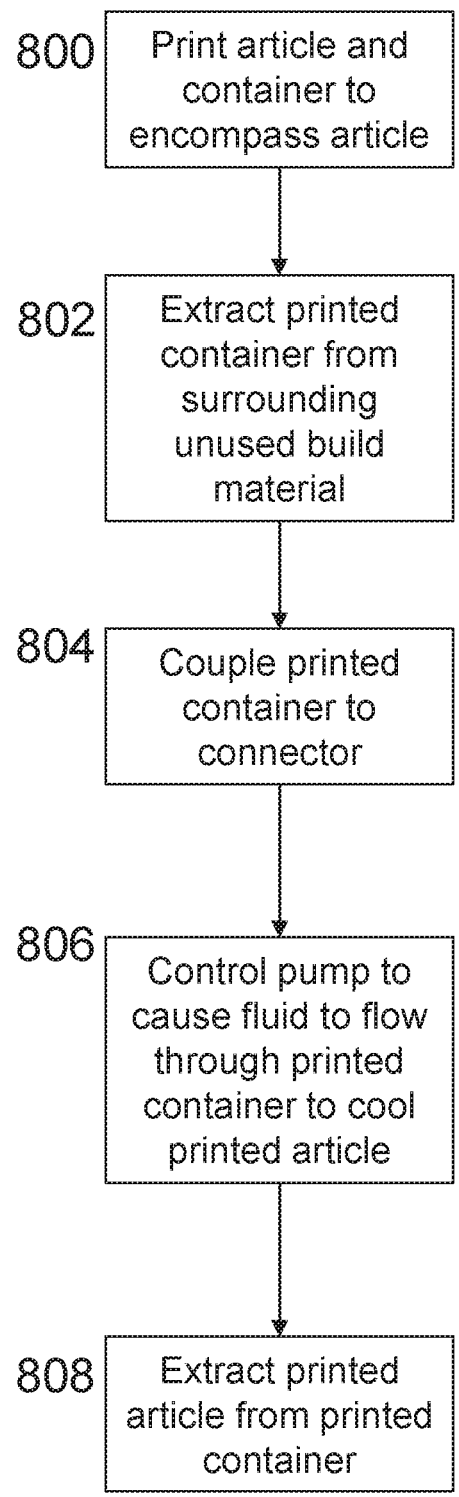
FIG. 8 shows an example method of cooling a 3D printed article by extracting the printed article from unused build material.

The flow chart of FIG. 8 illustrates an example of a method to print an article. In the example of FIG. 8, the article and container are printed as in other examples, but at 802 the printed container 204 is extracted from the powder cake prior to the printed container 204 being coupled to the connector 302. The printed container 204 may be removed from the surrounding unused build material by any appropriate mechanism known to the skilled person. The printed container may then be arranged as exemplified in FIG. 3.

It may be desirable to remove the printed container 204 from the printing bucket 210 and unused build material 212 in some cases. The unused build material 212 may act as a thermal store, and so the cooling process may be accelerated or made more efficient by removing the printed container 204 from the unused build material 212 as in the example of FIG. 3. In other cases, it may be desirable for the printed container 204 to remain in the unused build material 212 to facilitate processes such as annealing and curing as in the example of FIG. 4. As described above, the printed container 204 may be cooled with or without removing the printed container 204 from the powder cake, as exemplified by FIGS. 3 and 4 respectively.

After the printed container 204 has been removed from the surrounding unused build material, it may be coupled to the connector 302 and the printed article 202 within cooled by the flow of fluid.

The examples of FIGS. 7 and 8 illustrate two possible methods for printing and extracting a printed article 202. The printed container 204 may be cooled before or after being removed from surrounding unused build material. The surrounding build material may act as a store of thermal energy and as an insulator, which may affect cooling rates. The flow rate of the fluid may be controlled to compensate for the environment of the printed container 204.

The printed container 204 may be coupled to the connector 302 at the post processing station 106 after being removed from the unused build material. Alternatively, the post-processing station 106 may receive the example bucket 210 of FIG. 4 or similar, and thus cool the printed article 202 without requiring the removal of the printed container 204 from the powder cake.

The printed container 204 may be extracted from the surrounding unused build material prior to cooling or not depending on the choice of the user. In certain circumstances, it may be desirable to perform the cooling at a separate location to the 3D printing system, such as a post-processing station, so that the 3D printing system can be used to being a new printing operation. Alternatively, it may be desirable to cool the printed container 204 in place at the printing system, for example if the printed article 202 is fragile and there is a risk of damage in transit. Another example of such a situation would be where space is limited or the cooling operation may be performed in a short time to cool the printed article 202.

The printed article 202 may be cooled with the use of movable arms to drive the connector 302. For example, a user may operate the 3D printing system to print the article and container, and then operate the same system to provide the connector 302 to the relevant part of the printed container, for example the outlet 206. The arms may include functionality to automatically identify and connect to the outlet 206, such that the cooling process may be an integral part of an automated printing process that may be performed without multiple inputs from a user or operator. As an example, it may be possible to combine such a system with a 3D printing system that has means to remove the printed article 202 from the printed container 204, and then from the build platform, such that the process of manufacturing a printed article 202 can be largely automated.

All of the features disclosed in this specification (including any accompanying claims, abstract and drawings) may be combined in any combination, except combinations where at least some of such features are mutually exclusive.

It will be appreciated that the example methods described above in connection with the flow charts of FIGS. 5 to 8 may be controlled by a computer program. Such a computer program may comprise instructions arranged, when executed, by a processor of a 3D printer or a 3D printing system to control the 3D printer or 3D printing system to implement a three dimensional, 3D, printing method, including as appropriate the above described cooling methods. Such a computer program may be stored on a machine-readable storage.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract and drawings) may be envisaged. The claims should not be construed to cover merely the foregoing examples, but also any variants which fall within the scope of the claims.

The invention claimed is:

1. A 3D printing system comprising:
a selective solidification module configured to:
   form a printed article by processing a build material; and
   form a printed container, the selective solidification module configured to form the printed container encompassing and containing both the printed article and a portion of unused build material about the printed article, the printed container defining a first port and a second port fluidly connected to the first port;
a connector configured to couple to the first port or second port of the printed container; and
a pump fluidly connected to the connector, the pump arranged to cause a fluid to flow through the printed container from the first port to the second port such that the printed article is cooled by the fluid flow.

2. The 3D printing system of claim 1, further comprising a post processing station to:
receive a printed container; or
receive a printing bucket containing the printed container and unused build material surrounding the printed container;
wherein the post processing station includes the connector and the pump.

3. The 3D printing system of claim 1, wherein the pump is a fluid injector to cause fluid to flow by injecting fluid into the printed container; or
wherein the pump is a vacuum pump to cause the fluid to flow by pulling fluid through the printed container.

4. The 3D printing system of claim 1, further comprising a robotic arm to locate the printed container and drive the connector to couple to the first port or second port of the printed container.

5. A computer program comprising instructions arranged, when executed, by a processor of a three dimensional, 3D, printer to control the 3D printer to implement a 3D printing method comprising:
performing a printing operation comprising:
   forming a printed article by processing a build material; and forming a printed container encompassing the printed article and a portion of unused build material about the printed article, the printed container defining a first port and a second port fluidly connected to the first port.

6. A three dimensional, 3D, printing method comprising:
performing a printing operation comprising:
forming a printed article by processing a build material; and
forming a printed container encompassing the printed article and a portion of unused build material about the printed article, the printed container defining a first port and a second port fluidly connected to the first port.

7. The method of claim 6, further comprising causing a fluid to flow through the printed container from the first port to the second port such that the printed article within the container is cooled by the fluid flow.

8. The method of claim 7, further comprising determining a target cooling rate for the printed article and adjusting the rate of fluid flow from the first port to the second port of the container according to the target cooling rate for the printed article.

9. The method of claim 8, further comprising
measuring the temperature of the printed article, printed container or unused build material within the container; and
adjusting the rate of fluid flow from the first port to the second port according to the measured temperature.

10. The method of claim 7, wherein the fluid is a gas.

11. The method of claim 6, further comprising forming the printed container with a structure to facilitate opening of the printed container.

12. The method of claim 6, further comprising forming at least one of the first port and the second port of the printed container with a structure to restrict the egress of unused building material through the first port or the second port.

13. A method of generating print data comprising:
generating print data for a printed article and a printed container to encompass the printed article, the printed container defining a first port and a second port fluidly connected to the first port.

14. The method of claim 13, comprising:
processing the generated print data performing a printing operation comprising:
forming the printed article by processing a build material; and
forming the printed container encompassing the printed article and a portion of unused build material about the printed article.

15. The method of claim 6, further comprising forming the printed container to enclose a plurality of printed articles printed from a same stack of build material layers.

16. The method of claim 6, wherein at least one of the first and second ports comprises a printed mesh formed of the same build material as the printed article and printed container.

17. The method of claim 6, further comprising forming the first port with an outlet structured to engage with a connector of a vacuum system.

18. The method of claim 6, further comprising:
forming the printed container with a breakable portion; and
inserting a temperature probe into an interior of the printed container through the breakable portion.

19. The method of claim 13, further comprising printing the printed article and container together from a same stack of powdered material layers.

* * * * *